United States Patent [19]
Marshall

[11] Patent Number: 4,457,261
[45] Date of Patent: Jul. 3, 1984

[54] MITTENS FOR CANINES

[75] Inventor: Tina Marshall, 144-19 38th Ave., Flushing, N.Y. 11354

[73] Assignees: Bruce Marshall; Tina Marshall, both of Flushing, N.Y.

[21] Appl. No.: 371,853

[22] Filed: Apr. 26, 1982

[51] Int. Cl.$^3$ .............................................. A43B 3/00
[52] U.S. Cl. ...................................... 119/1; 36/111; D30/34
[58] Field of Search ..................... 119/1; 54/79, 82; 36/111; D30/34

[56] References Cited

U.S. PATENT DOCUMENTS

| | | | |
|---|---|---|---|
| 2,443,831 | 6/1948 | Miller | 54/79 |
| 3,747,565 | 7/1973 | Kellam | 54/82 X |
| 3,762,073 | 10/1973 | Cantales | 119/1 X |

Primary Examiner—Hugh R. Chamblee
Attorney, Agent, or Firm—Ladas & Parry

[57] ABSTRACT

Mittens for canines are made of light-weight, waterproof, flexible latex material and taper-off gradually near the bottom whereby the top of the mitten has a self gripping material to secure the top to the canine's leg.

7 Claims, 2 Drawing Figures

MITTENS FOR CANINES

BRIEF SUMMARY OF THE INVENTION

This invention relates to protective wear for the paws of canines to protect them from cold weather, ice, snow, and slush, and salt spread on the streets and sidewalks to thaw snow and ice.

During the winter, dogs and other canines suffer from the weather in the form of cold, ice, snow, and slush, and from salt spread in the streets and on the sidewalks. The salt is a particular problem since it burns and irritates the paws and causes irritation of the stomach when licked off by the dog.

On the market are dog boots made of a plastic waterproof material. The disadvantage of these boots is that they are not designed to fit on the paws, and instead resemble children's boots having a flat bottom. The material used is too stiff and as a result the boots are uncomfortable and non-conforming to the paws. They hinder the natural walk of the animal. The boots are fastened by way of a rubber band on a button which is led around the paw and fastened on said button or by a snap button. In practice, the boots do not stay on for any considerably length of time.

Cantales U.S. Pat. No. 3,762,073 granted Oct. 2, 1973 uses flexible material for the manufacture of canines' boots. A particular shape of the boots to conform to the dog's legs is required so excluding the use of very flexible material and a non-slid sole is adhesively secured or heat sealed to the surface of the plastic flexible material. The boots are secured to the dog's legs by adjustable securing means which may be adhesive tabs.

According to this invention mittens are provided which are made of light-weight, waterproof, flexible latex material having a velvet-soft inside and anti-slip outside, shaped in an at least near the bottom gradually tapered-off form and having attached around the open top a self-gripping material capable of securing said top around a canine's leg.

The present mittens during use stay on the paws of the animal without being uncomfortably tight on the legs so allowing for a natural walk and free blood circulation. The dog feels comfortable and unhindered in her movements as though the mittens were a natural part of her paws.

BRIEF DESCRIPTION OF THE DRAWINGS

FIG. 1 shows the mitten in closed form while secured to the dog's paw or leg.

FIG. 2 shows the mitten in open form.

DETAILED DESCRIPTION

Figure 1:
FIGS. 1 and 2 are side views of a mitten according to this invention.

The material from which the mittens according to this invention are made is a light-weight, flexible latex material having a non-slip grip on the outside (4) and a velvet-soft inside (5). This material is commercially available, e.g. it is used for the manufacture of Baltex (registered Trade Mark) latex gloves. Not any material is useful and the success of the present invention is a result at least of the fact that the latex material used is sufficiently flexible to bend and ply with the paws' movements. The material is generally less than 0.02 inch thick. Nevertheless, this material is strong enough to withstand the wear and tear of walking in the winter streets. The anti-slip outside prevents the dog from slipping on ice or snow. It is to be understood that at least the part under the bottom of the paw must be anti-slip, although the entire outside of the mitten may have the anti-slip surface.

The mittens may be made from the latex material by cutting a rectangular piece the width of which is about the same as the width of the dog's paws (one paw of a dog may be wider than another) when the dog is standing. The piece is folded in about the middle of the long side of the rectangular, such that the non-slip grip is on the outside under the paw (1) and the sides are folded in slightly so as to cause a tapering off at least at the bottom so as to avoid rectangular corners as illustrated in the figures. The sides are attached to each other, for instance by stitching them together. The periphery of the open top after the sides are attached to each other is about the same length as the periphery of the dog's paw when the dog is standing. There is no stitching at the bottom so that the dog does not have to feel any seam under her paws.

Alternatively, the mitten may be made from a seamless latex tube of the shape described above.

The invention uses a self-gripping material (3) fastened at the open top (2) of the mitten to secure the mitten to the dog's paws or legs. This material does not cut off blood circulation and can be closed and opened in one easy movement. The material is available commercially e.g. under the name Velcro (registered Trade Mark). This material avoids the need for buttons, elastic bands or drawstrings and was found to be sufficiently gripping to prevent slipping off during use. No or a negligible amount of water was found seeping in from the top when the dog walked through deep puddles. The material is available in long strips.

Figure 2:
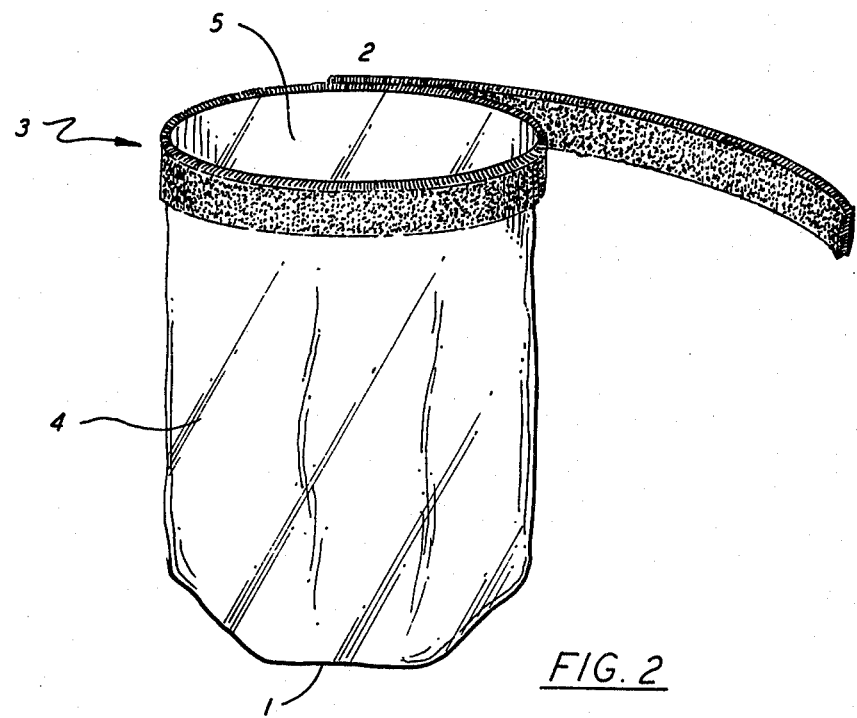

Such strip is attached to the top of the mitten, by any means e.g. by stitching or use of adhesive around the entire open top. The strip is longer than the periphery of the top and the loose strip remaining after attachment to the top is used to fasten the top to the dog's leg by leading the loose strip tightly around the leg and having the attached, e.g. stitched, strip press down on the loose strip in a gripping movement whereby the strips grip each other without slipping as shown in FIG. 2.

The mittens can be easily cleaned after use and dried. They take little space and can be brought along and put on the dog when necessary during an outdoors walk.

The point of fastening on the dog's leg is generally just up to and under the carpus which is just behind the back of the ankle of a dog. The mittens can of course be made in different sizes of width and length and the purchaser will select the correct size according to the width of the dog's paws and the height of the carpus.

I claim:

1. A mitten for canines which comprises a tube tapered-off at least near the closed bottom and having attached around the open top a strip of self-gripping material capable of securing said top to the canine, said tube being made of a light-weight, waterproof, flexible latex material having a soft inside surface and an anti-slip outside surface, substantially the entire outside of the latex material having said anti-slip surface.

2. A mitten according to claim 1, wherein said latex material has a thickness of less than 0.02 inch.

3. A mitten according to claim 1, wherein the periphery of the open top is about the same length as the periphery of the dog's paw when the dog is standing.

4. A mitten according to claim 1, wherein said tube has a length such that said strip of self-gripping material can be fastened on a dog's leg at a point just up to and under the carpus of the dog's leg.

5. A process for preparing a mitten for canines which comprises folding a rectangular piece of flexible, latex material having a soft inside and an anti-slip outside at about the middle of the length of the material attaching the sides to each other to form a tube having at least near the bottom a tapered form and attaching to the open top around its periphery a strip of self-gripping material whereby the length of the strip is larger than the periphery of said open top.

6. A process according to claim 5, wherein the sides are attached to each other by stitching.

7. A process for preparing a mitten for canines which comprises molding a latex material into a tube having at least near the bottom a tapered form, said material having a soft inside and an anti-slip outside and being flexible in nature, and attaching to the open top of the tube around its periphery a strip of self-gripping material whereby the length of the strip is longer than the periphery of said open top.

* * * * *